Figure 1:
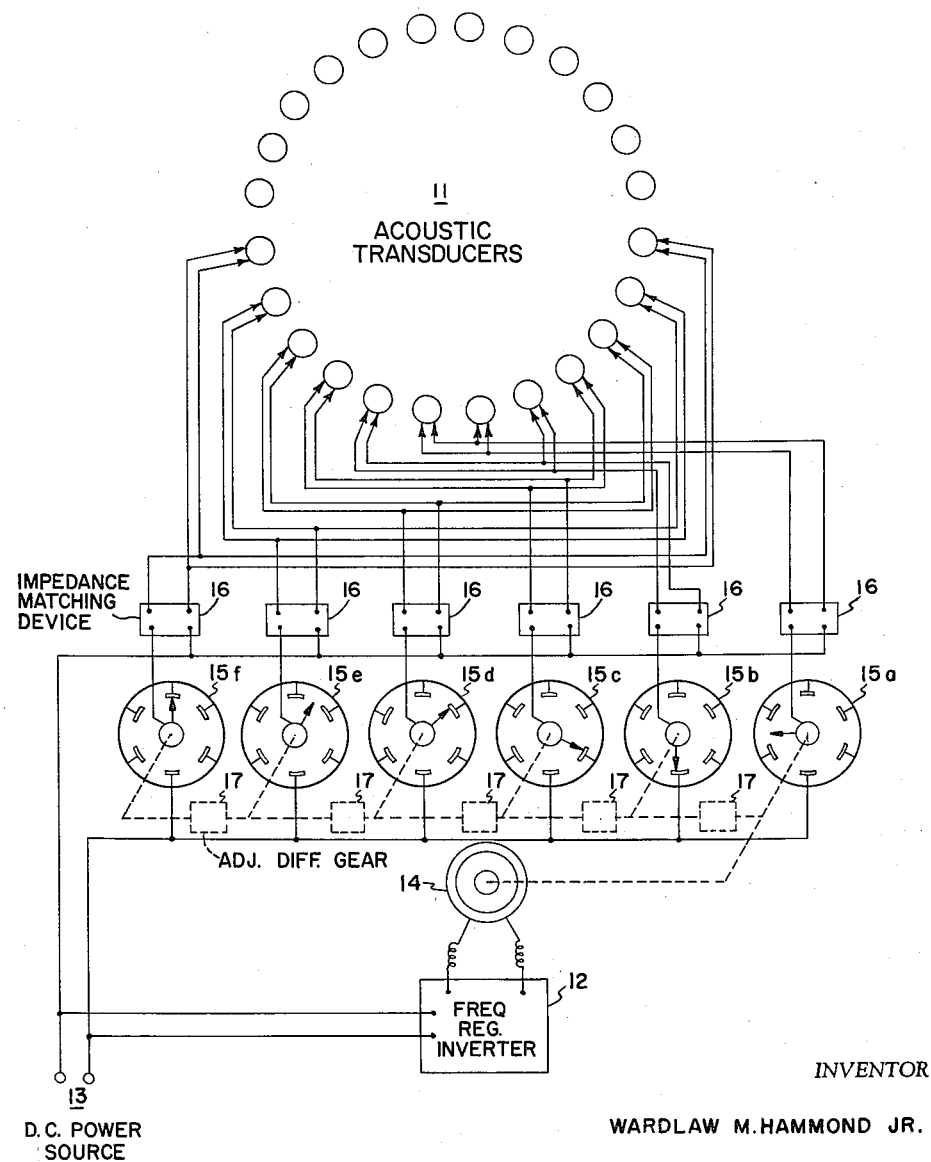

INVENTOR
WARDLAW M. HAMMOND JR.

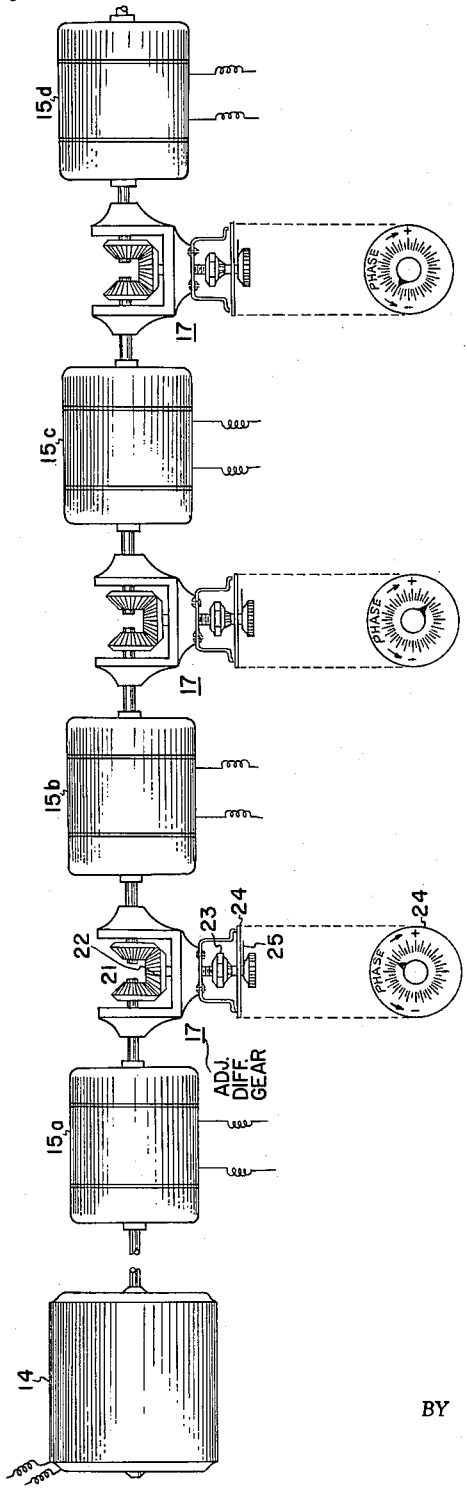

United States Patent Office 2,972,732
Patented Feb. 21, 1961

2,972,732

ACOUSTIC TRANSMITTING ARRAY

Wardlaw M. Hammond, Jr., Baltimore, Md., assignor to The Martin Company, a corporation of Maryland Filed Sept. 7, 1956, Ser. No. 608,573

10 Claims. (Cl. 340—5)

The present invention relates to a device adapted to supply frequency regulated power to an array of acoustical transducers and to provide the electrical phase at each transducer appropriate for beam formation.

An acoustical array of transducers such as a sonar transmitting array is frequently made up of a circular configuration of transducers so as to provide fast beam rotation by electrical means or in order that more than one beam may be formed simultaneously. In such a configuration a directive beam is conventionally formed by phasing the voltages exciting the transducers in such manner as to cause the resulting sound pressure wave to appear to originate from a plane surface or line. The phase shift required to form the beam in this manner is generally achieved through the use of a delay line made up of lumped constant filters. For high power transmitting arrays the delay lines become quite heavy and bulky. Accordingly, the present invention provides a simplified frequency regulated source of periodic current to actuate transducer elements of a sonar array. Each output is of separate phase and individually adjustable so that a directive beam can be produced from a curved array of transducers without the need of delay lines or electrical phase retarding devices.

The power unit or driver which is used to supply the power to the sonar array is another item of excessive complexity and weight if conventional techniques are employed. One type of power source includes transformer, rectifiers, filters, and oscillators which items contribute much weight to the overall unit making it undesirable for use in airborne applications since weight has always been a prime factor to consider in the designing of all equipment which is to be used in aircraft. A second type of power source using an alternator and delay lines is lighter but is not readily controlled as to frequency since the response time required of a frequency control system for an alternator supplying power intermittently is so fast as to cause difficulty in the design of an appropriate regulating system. Constancy of frequency is required in some sonar sets to permit operation of special sonar displays which measure rate of change of target range and also to allow the use of narrow band receivers. Therefore, the present invention is also directed to a power source for a directive sonar transducer array, having substantially less weight than allowed by practices used previously while still retaining necessary frequency controlled limits.

As described in detail later, an array of sonar transducers, in this particular illustrated embodiment of the invention, receive periodic current which is the output of a direct current power supply having passed through a switch or interrupter which "chopped" the current into pulses which will give each transducer an equivalent of the periodic current required for its operation. This switch is rotated, making and breaking contact at high speed by means of a synchronous motor. A plurality of switches connected to the same power source is used to provide separately phased outputs to the transducers as required to form a directive beam when using a curved array of transmitting elements. Phase relationship may be made adjustable in order to accommodate arrays of various sizes, shapes, or numbers of transducers. This power supply replaces the high voltage power supplies, condenser storage banks and delay lines which are usually found in sonar transmitters.

More specifically, this invention is a combined power unit and phasing scheme adapted to supply frequency regulated power directly to a transducer array. Furthermore it is apparent that this invention makes advantageous use of the high pulse power capacity sources extant in an aircraft, such as the D.C. electrical system, to eliminate the requirement of a separate power storage device such as condensers with their associated bulk and weight which are conventionally used to supply high pulse power output for sonar sets.

These as well as further advantages which are inherent in the invention will become apparent from the following description, reference being had to the accompanying drawings wherein:

Figure 1 is an embodiment of the invention showing the connection of the various elements constituting the power source to a portion of the transducers of a transducer array; and Figure 2 shows a mechanical arrangement constituting a means of adjusting the phase between individual switches used in the power unit.

With particular reference now to Figure 1, an embodiment of the features of the present invention is shown wherein the power or driver unit is illustrated as connected for use in conjunction with a portion of the transducers of a circular array of acoustical transducers 11 which may be sonar transducers. A frequency regulated inverter 12 is connected to a low power D.C. power source 13. Such a D.C. power source 13 is available in most aircraft and an additional power generator is not required for pulse outputs up to values as high as 10,000 watts. The inverter 12 drives the synchronous motor 14 at a constant speed. Proper frequency regulation of synchronous motor 14 is readily obtained since the motor load is friction only and independent of the power demand on the interrupted direct current. The motor 14 in turn operates all the rotary chopping switches 15a through 15f. In order to maintain proper operation of this device it is necessary to use high speed rotary switches which can handle high currents at very high switching speeds. One type of switch satisfactory for this purpose is made by the Fielden Instrument Division of Robertshaw-Fulton Controls Co. This type of switch makes use of a pool of mercury which is caused to rotate in an annulus containing a series of equally spaced contacts thereby making contact at equal time intervals.

The switches 15a–f interrupt the D.C. voltage from power source 13 and pass it through said switches in a chopped form and in this way provide a form of alternating current (herein referred to as periodic current) which is used for the operation of the sonar transducers 11. Impedance matching units 16 have been placed in series between each of the switches 15a–f and associated transducers 11 to insure a proper match between each of switches 15a–f and the two transducers connected to each switch as shown in this particular embodiment of the invention.

A separate chopping switch is provided for each voltage phase required. In the figure each switch feeds two transducers of the semi circular portion of the array of twenty-four transducers. The individual switch sections may have adjustable phase outputs by incorporating differential gear adjusting sections 17 between each of the switches 15a–f. Phase adjustment is necessary for different arrays wherein there is a change from the desired diameter of shape, which may be the result of manufacturing tolerances.

Figure 2 illustrates only one of several possible methods of adjusting the phasing of the individual chopping switches 15a–f in relation to each other. Synchronous motor 14 has a direct mechanical connection to switch 15a. Through a differential gear train 21 connection is made to the next adjacent switch 15b. On the shaft of gear 22 there is a locking nut 23 for holding a setting put into gear train 21 to adjust the phase of switch 15b in relation to 15a. Dial 24 in conjunction with pointer 25 indicates the phase adjustment made in an adjustment of gear train 21. In a similar manner phase adjustment is made by adjustment of the gear trains connected to the remaining switches.

In the operation of this device, D.C. power from power source 13 is supplied to inverter 12, which in turn supplies frequency regulated current to synchronous motor 14. Motor 14 drives rotary switches 15a–f which by means of the gearing arrangement illustrated in Fig. 2 are set in a predetermined phase relationship to each other. The switches are connected to D.C. power source 13, and the flow of current is interrupted by these switches, forming a constant frequency periodic current output from each switch. The outputs from each switch are fed to two laterally opposed transducer elements of the semicircular array through separate impedance matching networks.

The phase of the periodic current output from each switch is established by the difference of relative rotary position of each switch. Thus, separate transducers of the array are fed by voltages of differing phase such that the semicircular array of transducers becomes the electrical equivalent of a like number of transducers projected upon and lying in one plane wherein all transducers are excited at the same phase.

The power unit described has the advantage of being a simple and comparatively light unit for converting a direct current into a chopped current of regulated frequency suitable for supplying power to an array of acoustic transducers using alternating current supplied at audio frequency.

Additional embodiments of the invention in this specification will occur to others and therefore it is intended that the scope of the invention be limited only by the appended claims and not by the embodiment described hereinabove.

What is claimed is:

1. A power unit producing periodic current power from a direct current source for energizing an array of acoustic transducers comprising a frequency regulated inverter receiving power from said direct current source, a synchronous motor made to rotate at a constant speed by said inverter, a plurality of multicontact switches continuously operated by said motor, means to adjust the relative contact positions of said switches to phase them in relation to each other, said switches receiving current from said direct current source and are connected to produce a multiplicity of periodic current outputs with predetermined phase relations by interrupting actions developed by operation of said switches, means connecting said switches to said array of acoustic transducers, whereby the production of said periodic current outputs in said predetermined phase relation by said switches will energize said array of acoustic transducers so as to produce a highly directive sonar beam.

2. A power supply system for energizing an array of acoustical transducers capable of forming a highly directive sonar beam at audio frequencies from a direct current source comprising a plurality of rotary multicontact switches set in a predetermined phased relation to each other and each being connected to said source of direct current, means to rotate said switches in said phased relation and at constant speed, said switches being connected to supply separately phased chopped current outputs to said transducers providing phased electrical energy for operation thereof.

3. A power supply system in accordance with claim 2 which includes adjusting means for said switches whereby the phase relation of said phased outputs may be varied.

4. A power unit for producing periodic current power from a direct current source for energizing an array of acoustic tansducers comprising a frequency regulated inverter supplied with power from said direct current source, a synchronous motor supplied with power from said inverter, and a plurality of rotary switches driven by said motor, each of said switches being connected between said direct current source and at least one of said transducers so as to interrupt the circuit therebetween at least once during each revolution of said switch, and means to phase said switches so that the periodic current power supplied to each of said transducers will be phased in definite relation to the power supplied to the other said transducers.

5. A power unit for producing high power alternating current from a direct current source for energizing an array of acoustical transducers comprising a frequency regulated inverter supplied with power from said direct current source, a synchronous motor supplied with power from said inverter, a plurality of rotary switches driven by said motor, each of said switches being connected between said direct current source and at least one transducer of said array so as to form a periodic connection between said transducer and said direct current source, and means to adjust the angular positions of said switches so that the transducers of said array will be energized in definite time relation with each other to form a highly directive beam.

6. A power supply system for energizing an array of acoustical transducers capable of producing a highly directive sonar beam comprising a plurality of rotary multicontact switches designed to interruptably switch direct current and arranged to produce periodic current of particular phase relation, driving means operative on direct current for simultaneously rotating said switches at a constant speed, means connecting said switches to said array so as to supply said periodic current thereto, whereby said transducers will be sequentially energized by said periodic current so as to form said highly directive sonar beam.

7. A power supply system utilizing a direct current source for energizing an array of acoustical transducers capable of producing a highly directive sonar beam comprising a frequency regulated inverter connected to receive power from said direct current source, a synchronous motor connected to receive power from said inverter, a plurality of multicontact rotary switches connected to said direct current source, each of said switches being arranged to produce direct current from said direct current source during at least half of one rotation of said switch so as to produce a periodic current output, said switches being arranged so that the said periodic current outputs are in a definite phase relation, said synchronous motor being mechanically connected to rotate said switches, a plurality of impedance matching networks, each of said impedance matching networks being connected between one of said switches and at least one of said transducers of said array, whereby said acoustical transducers of said array will be energized by alternating current to produce said highly directive sonar beam.

8. A power supply system in accordance with claim 7 which includes mechanical adjusting means connected between said synchronous motor and said switches whereby the phase relation of said periodic current outputs may be varied.

9. A power supply system in accordance with claim 8 in which said mechanical adjusting means are adjustable differential gears.

10. A power supply system in accordance with claim 7 in which the outer cases of said rotary switches are rotatable so that the time of closing and opening of said switches can be shifted to vary the phase relation of said periodic output pulses.

References Cited in the file of this patent

UNITED STATES PATENTS

| | | |
|---|---|---|
| 1,645,810 | Hubbard | Oct. 18, 1927 |
| 2,512,615 | Earp | June 27, 1950 |
| 2,586,342 | Jarvis | Feb. 19, 1952 |
| 2,625,661 | Haydon | Jan. 13, 1953 |

FOREIGN PATENTS

| | | |
|---|---|---|
| 638,292 | Great Britain | June 7, 1950 |